US009841813B2

(12) United States Patent
Srail

(10) Patent No.: US 9,841,813 B2
(45) Date of Patent: Dec. 12, 2017

(54) AUTOMATED VEHICLE HUMAN-MACHINE INTERFACE SYSTEM BASED ON GLANCE-DIRECTION

(71) Applicant: DELPHI TECHNOLOGIES, INC., Troy, MI (US)

(72) Inventor: Douglas A. Srail, Kokomo, IN (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 29 days.

(21) Appl. No.: 14/977,874

(22) Filed: Dec. 22, 2015

(65) Prior Publication Data

US 2017/0177076 A1 Jun. 22, 2017

(51) Int. Cl.
*G06F 3/01* (2006.01)
*G06F 3/00* (2006.01)
(Continued)

(52) U.S. Cl.
CPC .......... *G06F 3/013* (2013.01); *B60W 50/087* (2013.01); *B60W 50/10* (2013.01); *G06F 3/005* (2013.01);
(Continued)

(58) Field of Classification Search
CPC ...... G06F 3/013; G06F 3/055; G06F 3/04817; B60W 50/087
See application file for complete search history.

(56) References Cited

U.S. PATENT DOCUMENTS 4,973,149 A * 11/1990 Hutchinson ............ A61B 3/113 351/210
6,437,758 B1 * 8/2002 Nielsen .................. G06F 3/013 345/7

(Continued)

FOREIGN PATENT DOCUMENTS

WO 86/03863 7/1986

OTHER PUBLICATIONS

Dagmar Kern, et al: "Making use of drivers' glances onto the screen for explicit gaze-based interaction", Nov. 11, 2010, p. 110-113.

(Continued)

*Primary Examiner* — Benyam Ketema
(74) *Attorney, Agent, or Firm* — Lawrence D. Hazelton

(57) ABSTRACT

A human-machine interface (HMI) system used to indicate a vehicle-feature based on glance-direction of an occupant of the vehicle includes a camera and a controller. The camera is used to capture a sequence-of-images of an occupant of a vehicle. The controller is configured to determine a plurality of glance-directions from the sequence-of-images, define a plurality of glance-zones based on the plurality of glance-directions, one glance-zone for each glance-direction, define an intersection-zone based on an intersection of two or more of the glance-zones, determine an outlier-count based on how many of the plurality of glance-zones do not intersect with the intersection-zone, and select a vehicle-feature in the vehicle indicated by the occupant, said vehicle-feature located at a location inside the vehicle that corresponds to the intersection-zone, said vehicle-feature indicated by the
(Continued)

operator when the outlier-count during the pause-interval is less than a paused-threshold.

9 Claims, 4 Drawing Sheets

(51) Int. Cl.
*B60W 50/10* (2012.01)
*B60W 50/08* (2012.01)
*G06F 3/0481* (2013.01)

(52) U.S. Cl.
CPC ..... *B60W 2540/04* (2013.01); *G06F 3/04817* (2013.01)

(56) References Cited

U.S. PATENT DOCUMENTS 7,068,813 B2 * 6/2006 Lin ..................... G06F 3/013 351/209
7,561,143 B1 * 7/2009 Milekic ..................... G06F 3/013 345/156
7,857,452 B2 * 12/2010 Martinez-Conde .... A61B 3/113 351/209
8,225,229 B2 * 7/2012 Thorn ..................... G09G 5/00 715/764
8,885,882 B1 * 11/2014 Yin ..................... G06F 3/00 382/103
2002/0141614 A1 * 10/2002 Lin ..................... G06F 3/013 382/103
2003/0091215 A1 * 5/2003 Lauper ............... G06K 9/00597 382/117
2007/0263923 A1 * 11/2007 Gienko ..................... A61B 3/113 382/154
2007/0279590 A1 12/2007 Ebisawa
2009/0012419 A1 * 1/2009 McKee ..................... A61B 5/16 600/558
2009/0022368 A1 1/2009 Matsuoka et al.
2009/0125849 A1 * 5/2009 Bouvin ..................... G06F 3/013 715/863
2009/0315827 A1 * 12/2009 Elvesj ..................... G06F 3/013 345/157
2010/0118267 A1 * 5/2010 Helfman ............... G06T 11/206 351/209
2010/0156617 A1 * 6/2010 Nakada ..................... A61B 3/113 340/439
2011/0273466 A1 * 11/2011 Imai ..................... G09G 3/20 345/589
2012/0146891 A1 * 6/2012 Kalinli ..................... H04N 19/33 345/156
2012/0249741 A1 * 10/2012 Maciocci ............... G06F 3/011 348/46
2013/0024047 A1 * 1/2013 Kalhous ..................... G06F 3/013 701/1
2013/0120841 A1 * 5/2013 Shpunt ..................... G01B 11/25 359/558
2013/0154913 A1 * 6/2013 Genc ..................... G06F 3/012 345/156
2013/0342672 A1 12/2013 Gray et al.
2014/0168056 A1 * 6/2014 Swaminathan .... G06K 9/00604 345/156
2014/0184550 A1 * 7/2014 Hennessey ............. G06F 3/013 345/173
2014/0354539 A1 * 12/2014 Skog ..................... G06F 3/013 345/156
2014/0361971 A1 * 12/2014 Sala ..................... G06F 3/041 345/156
2015/0234459 A1 * 8/2015 George-Svahn ........ G06F 3/013 345/156
2016/0320835 A1 * 11/2016 Kuehne ..................... B60K 37/00

OTHER PUBLICATIONS

Robert J. K. Jacob: "The use of eye movements in human-computer interaction techniques", Apr. 1, 1992, pp. 152-169.
Robert J.K. Jacob, et al: "Eye Tracking in Human-Computer Interaction and Usability Research-Commentary on Section 4: Ready to Deliver the Promises", Jan. 1, 2003, pp. 573-605.
Goldberg J.H., et al: "Computer interface evaluation using eye movements: Methods and constructs", Oct. 1, 1999, pp. 631-645.

* cited by examiner

AUTOMATED VEHICLE HUMAN-MACHINE INTERFACE SYSTEM BASED ON GLANCE-DIRECTION

TECHNICAL FIELD OF INVENTION

This disclosure generally relates to a glance-direction based human-machine interface (HMI), and more particularly relates to a system that selects a vehicle-feature based on an intersection-zone defined by the intersection of two or more of the glance-zones.

BACKGROUND OF INVENTION

Eye glance-direction or eye gaze-direction has been suggested as a means to interact with an automotive system. While eye position can be accurately determined by various camera systems, the dynamic characteristics of eye movement when users are viewing automotive displays and objects within the vehicle often hinders the usefulness of eye glance-direction to control automotive systems. Various types of filtering have been proposed, but results have generally been found to be inadequate.

SUMMARY OF THE INVENTION

In accordance with one embodiment, a human-machine interface (HMI) system suitable for use in an automated vehicle is provided. The system is used to indicate a vehicle-feature based on glance-direction of an occupant of the vehicle. The system includes a camera and a controller. The camera is used to capture a sequence-of-images of an occupant of a vehicle. The controller is in communication with the camera. The controller is configured to determine a plurality of glance-directions from the sequence-of-images received by the controller during a pause-interval. One glance-direction is determined for each image. The controller is also configured to define a plurality of glance-zones based on the plurality of glance-directions, one glance-zone for each glance-direction. The controller is also configured to define an intersection-zone based on an intersection of two or more of the plurality of glance-zones. The controller is also configured to determine an outlier-count based on how many of the plurality of glance-zones do not intersect with the intersection-zone. The controller is also configured to select a vehicle-feature in the vehicle indicated by the occupant. The vehicle-feature is located at a location inside the vehicle that corresponds to the intersection-zone. The vehicle-feature is indicated by the operator when the outlier-count during the pause-interval is less than a paused-threshold.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
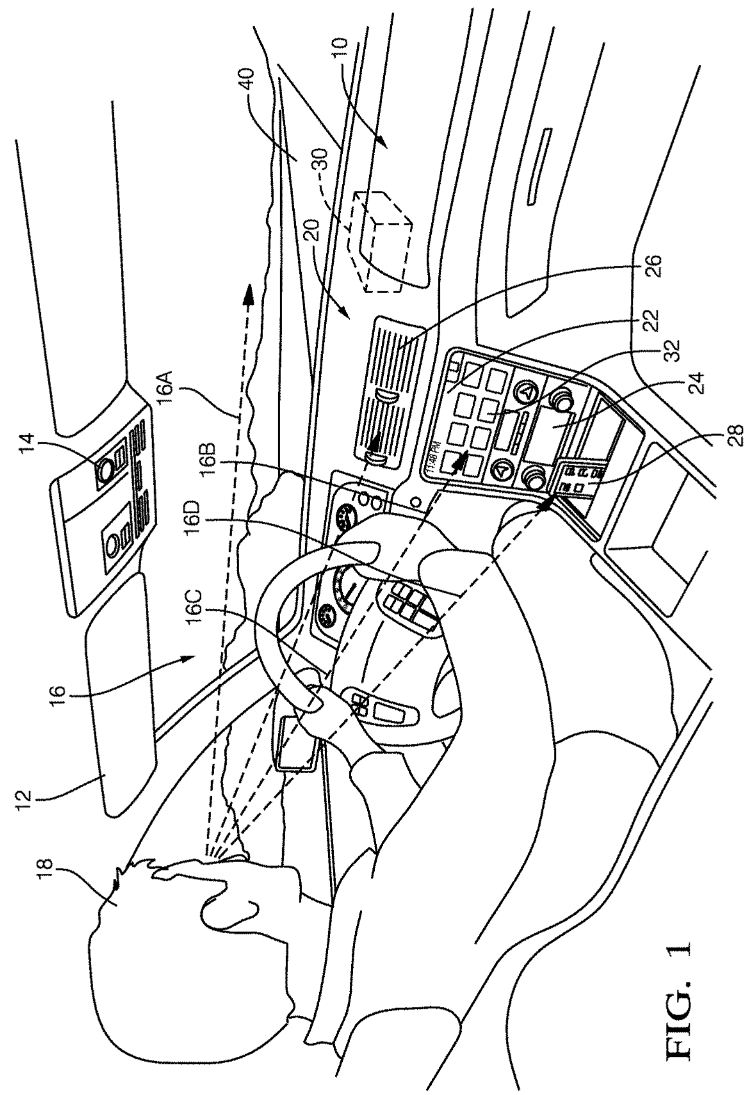
FIG. 1 is perspective view of a vehicle equipped with a human machine interface (HMI) system in accordance with one embodiment.
Figure 2:
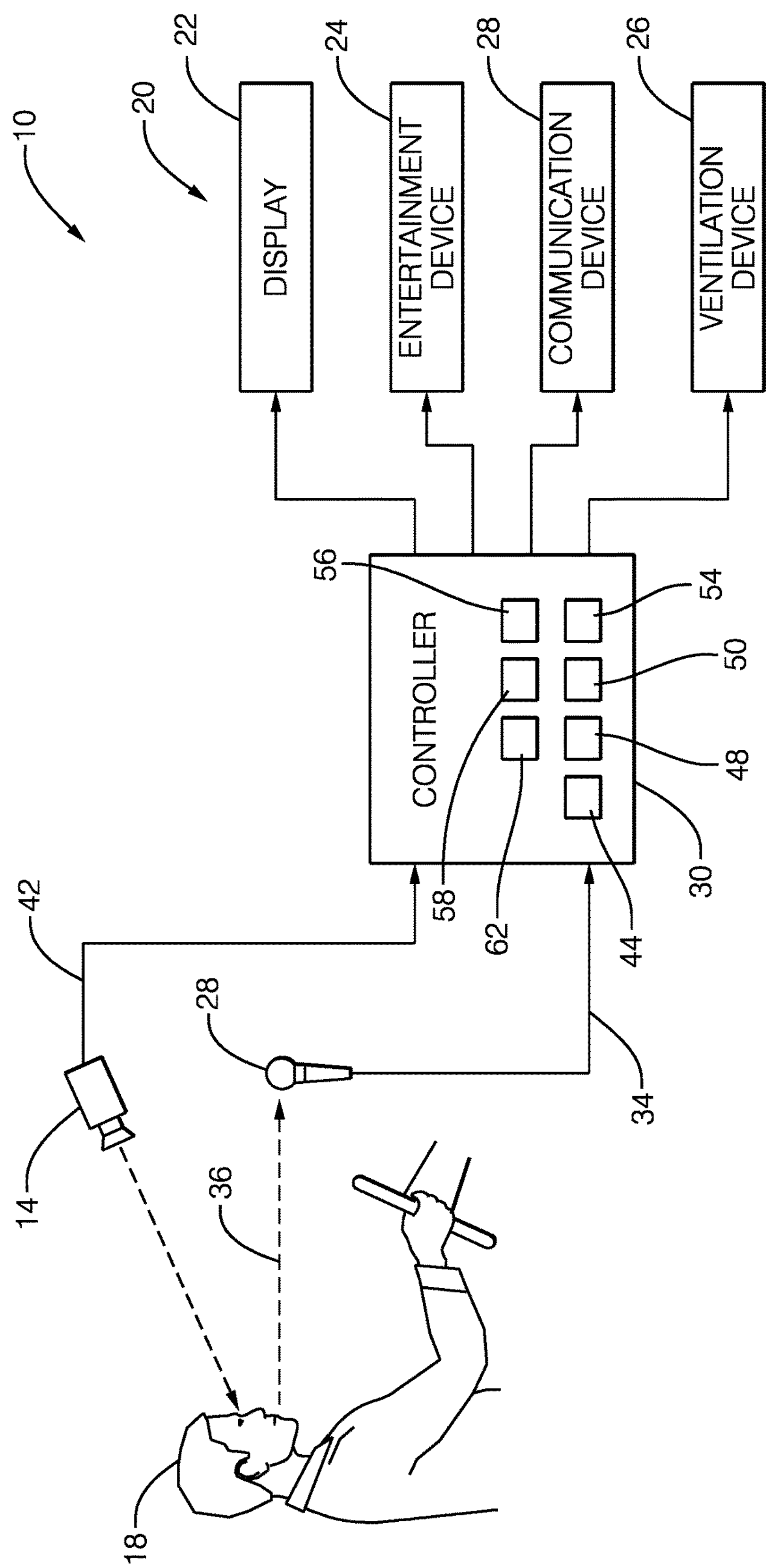
FIG. 2 is a block diagram of the system of FIG. 1 in accordance with one embodiment.

FIGS. 1-2 illustrate a non-limiting example of a human-machine interface (HMI) system, hereafter referred to as the system 10. The system 10 is generally suitable for use in an automated vehicle, hereafter referred to as the vehicle 12. It is contemplated that the vehicle 12 could be a fully-automated or autonomous vehicle where an occupant 18 merely indicates a destination and does not do anything to directly operate the vehicle 12 with regard to steering, acceleration, or braking. It is also contemplated that the vehicle 12 could be partially automated where the system 10 only operates the vehicle 12 during special circumstances, or merely provides an audible or visual warning to the occupant 18 to assist the occupant 18 when the occupant 18 is in complete control of the steering, acceleration, and braking of the vehicle 12. While FIGS. 1-2 may suggest that the occupant 18 is the operator of the vehicle 12, it is recognized that the system 10 described herein could also be an HMI for a passenger in the vehicle 12.

In general, the system 10 used to indicate or select a vehicle-feature 20 in the vehicle 12 based on glance-direction 16 of the occupant 18. That is, the system 10 generally makes decisions about operating the vehicle 12 based on where the occupant 18 is looking. For example, the system 10 may determine that the occupant 18 exhibits a first-glance-direction 16A so is looking at something outside the vehicle 12 such as a roadway 40. By way of further example, the occupant 18 may exhibit a second-glance-direction 16B toward a display 22, a third-glance-direction 16C toward a ventilation device 26, or a fourth-glance-direction 16D toward a communication device 28 (i.e. a smart phone) or an entertainment device 24 in the vehicle 12. As will be described in more detail below, the system 10 is configured to respond to the glance-direction 16 by, for example, updating a menu of options on the display 22 so the options are related to what the occupant 18 was looking at, activating the communication device 28 in order to make a phone call, or selecting a particular icon 32 on the display 22.

In order to determine the glance-direction 16 of the occupant 18, the system 10 includes a camera 14 (e.g. a video camera) used to capture a sequence-of-images 42 of an occupant 18 of a vehicle 12. The camera 14 is preferably an infrared type camera so the occupant can be unobtrusively illuminated with an infrared light source (not shown) during nighttime operation. The system 10 also includes a controller 30 in communication with the camera 14. The controller 30 may include a processor (not specifically shown) such as a microprocessor or other control circuitry such as analog and/or digital control circuitry including an application specific integrated circuit (ASIC) for processing data as should be evident to those in the art. The controller 30 may include memory, including non-volatile memory, such as electrically erasable programmable read-only memory (EEPROM) for storing one or more routines, thresholds, and captured data. The one or more routines may be executed by the processor to perform steps for determining if signals received by the controller 30 from the camera 14 indicate that the occupant 18 is looking at a particular instance of the vehicle-feature 20 as described herein.

Figure 3:
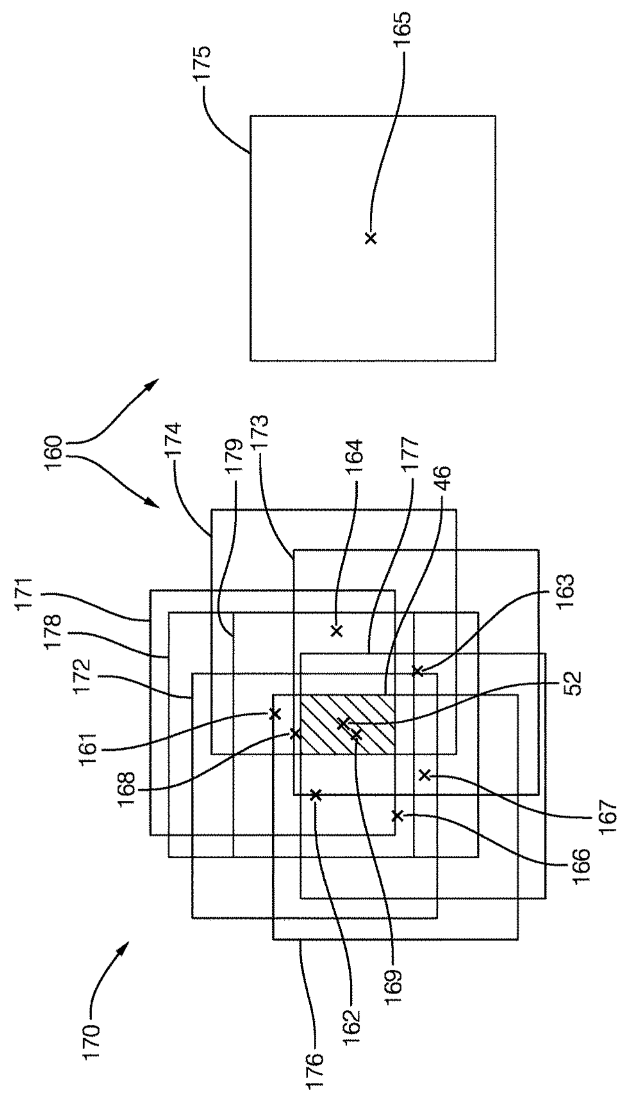
FIG. 3 is a diagram representative of glance-directions determined by the system of FIG. 1 in accordance with one embodiment.

FIG. 3 illustrates a non-limiting example of a representation of how the controller 30 is configured to indicate or select the vehicle-feature 20 (e.g. the display 22, the ventilation device 26, the communication device 28, or the entertainment device 24) in the vehicle 12, where the selection is determined based on the glance-direction 16. As will become apparent in the description that follows, the 'x's and boxes shown in FIG. 3 do not actually exist. Rather they are used to provide a visual representation of how the sequence-of-images 42 is processed by the controller 30 to determine the glance-direction 16 of the occupant 18.

As a first step, the controller 30 may be configured to determine a plurality of glance-directions 160 from the sequence-of-images 42 received by the controller 30 during a pause-interval 44. By way of example and not limitation, the pause-interval 44 may be two-hundred milliseconds (200 ms) which is preferably a predetermined value stored in the controller 30. The number of images received during the pause-interval 44 is determined based on the frame-rate of the camera 14. A suitable frame-rate for the camera 14 is ten frames-per-second (10 fps) to sixty frames-per-second (60 fps). Each individual instance of a glance-direction 161, 162, 163, 164, 165, 166, 167 corresponds one each to an image in the sequence-of-images 42. Nine instances of the glance-direction 161, 162, 163, 164, 165, 166, 167, 168, 169 (each marked with an 'x') are shown only for the purpose of simplifying the illustration. A higher frame-rate that results in more instances of the glance-direction during the pause-interval 44 is contemplated.

As a second step, the controller 30 may be configured to define a plurality of glance-zones 170 based on the plurality of glance-directions 160, where each instance of a glance-zone 171, 172, 173, 174, 175, 176, 177, 178, 179 is associated with each instance of the glance-direction 161, 162, 163, 164, 165, 166, 167, 168, 169. The size of the glance-zone may be selected or varied based on, but is not limited to, distance from the eyes of the occupant 18 to the vehicle-feature 20, relative proximity of other vehicle-features, the frame-rate and/or resolution of the camera 14, speed and/or vibration levels experienced by the vehicle 12, and the like. The each instance of the glance-zone 171, 172, 173, 174, 175, 176, 177, 178, 179 is shown as a square, but this is not a requirement. Rectangles, circles, and polygons both regular and irregular as well as three dimensional glance-zones for non-planar vehicle-features are contemplated, and shapes other than square may be preferable if multiple instances of the vehicle-feature 20 are spaced closely together.

As a third step, the controller 30 may be configured to define an intersection-zone 46 based on an intersection of two or more of the plurality of glance-zones 170. If the occupant 18 continues to look at about the same spot in the vehicle 12, the size and shape of the intersection-zone 46 may vary as the number of instances of the glance-zone 171, 172, 173, 174, 175, 176, 177, 178, 179 that intersect to define the intersection-zone 46 varies. Due to noise in the way the controller 30 determines each instance of the glance-direction 161, 162, 163, 164, 165, 166, 167, 168, 169, there may be times when of one or more instances of the glance-zone 171, 172, 173, 174, 175, 176, 177, 178, 179 do not intersect with the intersection-zone 46. In FIG. 3, the glance-zone 175 is an example. The controller 30 may be configured to exclude the glance-zone 175 from the determination of the intersection-zone 46 by labeling or tagging the glance-zone 175 as an 'outlier'.

As a fourth step, the controller 30 may be configured to determine an outlier-count 48 (FIG. 2) based on how many of the plurality of glance-zones 170 do not intersect with the intersection-zone 46. For the example in FIG. 3, the outlier-count 48 is equal to one (1) because only the glance-zone 175 as an outlier. It should be appreciated that a decreasing value of the outlier-count 48 indicates that glance-direction 16 of the occupant 18 is toward the intersection-zone 46 and is relatively steady, and that an increasing value of the outlier-count 48 indicates that glance-direction 16 of the occupant 18 is not relatively steady, i.e. is moving, or is directed in a relatively steady manner at a location other than what is indicated by the intersection-zone 46.

As a fifth step, the controller 30 may be configured to select a vehicle-feature 20 in the vehicle 12 indicated by the occupant 18, where the vehicle-feature 20 located at a location 52 inside the vehicle 12 that corresponds to the intersection-zone 46, and the vehicle-feature 20 indicated by the occupant 18 when the outlier-count 48 during the pause-interval 44 is less than a paused-threshold 54. That is, the controller 30 establishes that the vehicle-feature 20 at the location 52 that corresponds to the intersection-zone 46 is indicated by the occupant 18 because the glance-direction 16 has been sufficiently steady for enough time for the outlier-count 48 to decrease to a value less than the paused-threshold 54. In FIG. 3 the location 52 is shown as centered in the intersection-zone 46, however this is not a requirement. It may be advantageous for the location 52 to be biased off-center when, for example, other instances of the vehicle-feature are nearby.

In one embodiment of the controller 30, the intersection-zone 46 may 'disappear' if the occupant 18 looks (i.e. glances) at a location well away from the intersection-zone 46. After a time equal to the pause-interval 44 has passed while looking away from the intersection-zone 46, all instances of the plurality of glance-zones 170 that cooperated to define the prior instance of the intersection-zone 46 will time-out, and the controller 30 will look for a new intersection-zone. It is noted that all instances of the glance-zone will have been classified as outliers, so it may be necessary to re-evaluate which instance of the glance-zone intersect at some new location, and which should still be classified as outliers.

In an alternative embodiment, the controller 30 may be configured to 'release' or 'unlock' the vehicle-feature 20 indicated by the occupant 18 when the outlier-count 48 during the pause-interval 44 is greater than a moved-threshold 50, followed by a selection of another instance of the vehicle-feature 20. That is, when the occupant 18 looks at a location other than where the intersection-zone 46 was previously determined to be located, the controller 30 can begin looking for a new instance of intersection-zone at this new location before all of the prior instances of the plurality of glance-zones 170 that cooperated to define the prior instance of the intersection-zone 46 have timed-out. By way of example and not limitation, if the frame-rate of the camera 14 is such that nine images are captured during the pause-interval 44, then a suitable value for the moved-threshold may be five (5). This would effectively reduce the delay of starting to determine a new intersection-zone by about half.

If the occupant 18 changes the glance-direction 16 relatively quickly from some location inside the vehicle 12, e.g. from the second-glance-direction 16B, to the first-glance-direction 16A which is outside of the vehicle 12, the controller 30 may be advantageously configured to maintain or lock-on the vehicle-feature 20 indicated by the occupant 18 at a selected-status when subsequent-images indicate a glance-direction 16 that is characterized as outside the vehicle 12. This configuration would allow the operator to direct the glance-direction 16 toward the desired instance of the vehicle-feature 20 for just enough time to select the desired instance of the vehicle-feature 20, and the return attention to the roadway 40 to verify safe operation of the vehicle 12 before again exhibiting another glance-direction within the vehicle 12 to make a subsequent selection. For example, the first glance may select an icon 32 on the display 22 which causes the display 22 to be revised in accordance with the icon 32 that was selected. In this manner, the occupant 18 can step through various menus and sub-menus by performing a string of individual glances that are sufficient to make a selection.

Figure 4:
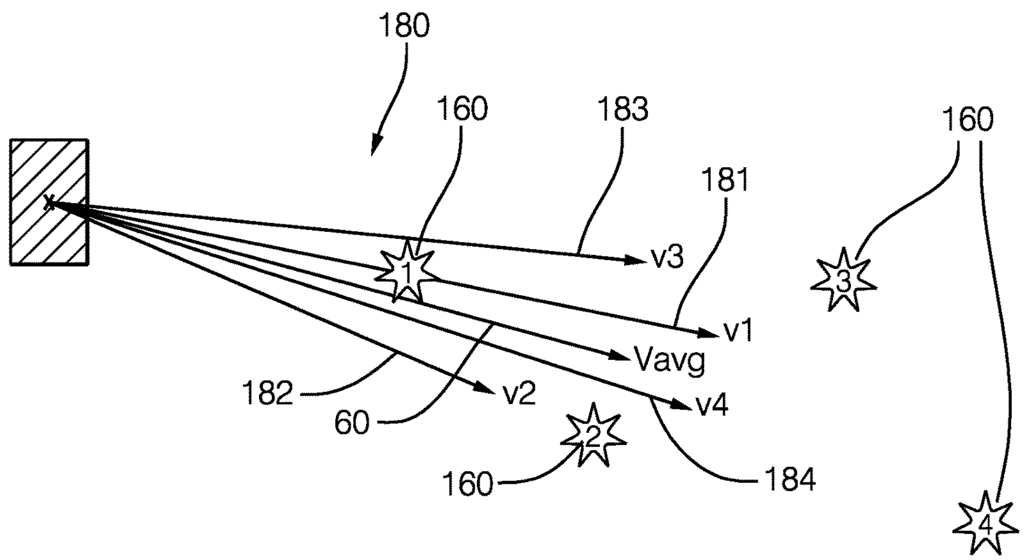
FIG. 4 is a diagram representative of glance-directions determined by the system of FIG. 1 in accordance with one embodiment.

FIG. 4 illustrates a non-limiting example of an alternative to the various ways suggested above to accelerate the selection of a new instance of the vehicle-feature 20 after a prior instance has already been selected where the controller 30 may determine a velocity 180 of the glance-direction based on a difference in the glance-direction indicated by two temporally displace images. For example, the controller 30 may be configured to determine an average-velocity 60 of the plurality of glance-directions 160 from the sequence-of-images 42 (FIG. 1) received by the controller 30 during a movement-interval 56, and release the vehicle-feature 20 indicated by the occupant 18 when the average-velocity 60 during the movement-interval 56 is greater than a velocity-threshold 58, followed by a selection of another instance of the vehicle-feature 20. To determine the average-velocity 60, the controller 30 is configured to determine an instantaneous-velocity 181, 182, 183, 184 for each of the plurality of glance-directions 160 during the movement-interval 56, and then calculate the average-velocity 60 based on the instantaneous-velocity 181, 182, 183, 184. If any of the plurality of glance-directions 160 includes any of the various sources of noise described above, the controller 30 may be further configured to exclude any instantaneous-velocity 181, 182, 183, 184 that is greater than a maximum-velocity 62 from the calculation of the average-velocity 60.

A suitable value for the movement-interval 56 is one-hundred milliseconds (100 ms) as that has been observed to be about as long as a typical person takes to move a glance-direction from one location and focus on another location. As such, the movement-interval 56 is less than the pause-interval 44.

Figure 5:
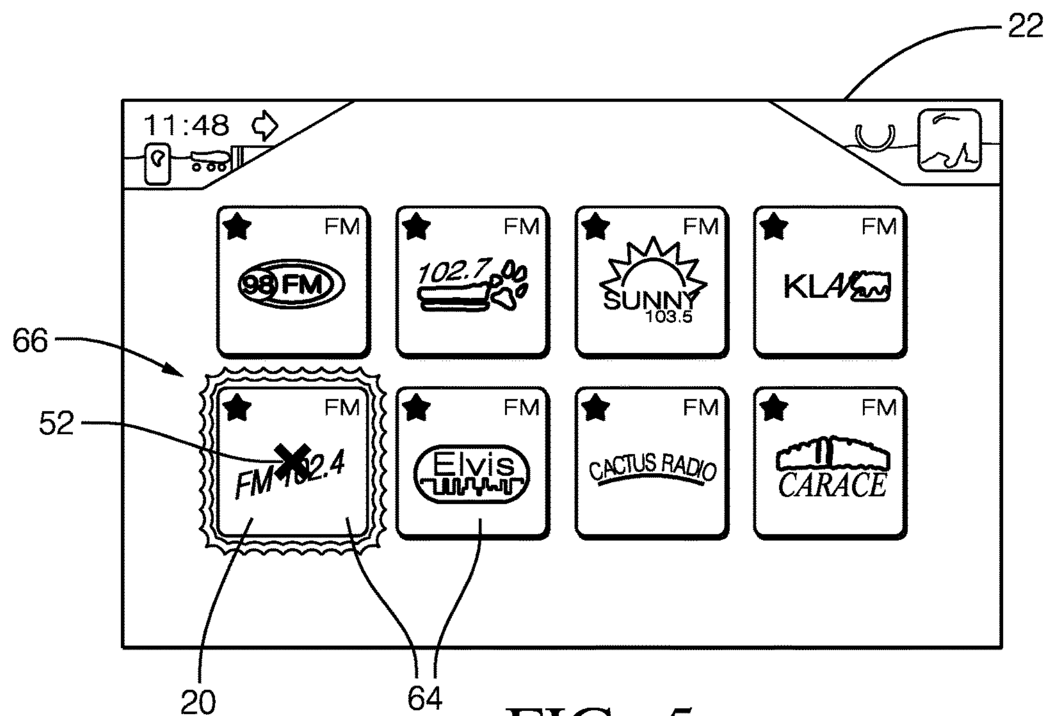
FIG. 5 is an illustration of a display of the system of FIG. 1 in accordance with one embodiment.

FIG. 5 illustrates a non-limiting example of multiple instance of an icon 64 displayed on the display 22. The display 22 is positioned to be viewable by the occupant 18 so that the vehicle-feature 20 in this example is the icon 64 displayed by the display 22. It follows that the controller 30 is configured to determine that the icon 64 is indicated by the occupant 18 when the location 52 corresponds to the icon 64. In response to the occupant 18 indicating that the icon 64 is selected, the controller 30 may be further configured to highlight 66 the icon 64 indicated by the occupant 18 by, for example, enlarging the icon 64, adding an enhanced border around the icon 64, changing the color of the icon 64, and/or flashing the icon 64. In further response to the icon 64 being indicated, the controller 30 may update the display 22 to show a sub-menu that is related to the icon 64 that was selected.

Accordingly, a human-machine interface (HMI) system (the system 10), a controller 30 for the system 10 and a method of operation described by steps performed by the controller 30 is provided. A plurality of glance-zones 170 are analyzed to identify the intersection-zone 46 which is intern used to determine the location 52 that the occupant 18 appears to be focused on so the vehicle-feature 20 located at the location 52 can be identified or selected.

While this invention has been described in terms of the preferred embodiments thereof, it is not intended to be so limited, but rather only to the extent set forth in the claims that follow.

We claim:

1. A human-machine interface system suitable for use in an automated vehicle, said system used to indicate a vehicle-feature based on glance-direction, said system comprising: a camera used to capture a sequence-of-images of an occupant of a vehicle; and a controller in communication with the camera, said controller configured to determine a plurality of glance-directions from the sequence-of-images received by the controller during a pause-interval, one glance-direction for each image, define a plurality of glance-zones based on the plurality of glance-directions, one glance-zone for each glance-direction, define an intersection-zone based on where two or more of the plurality of glance-zones intersect, determine an outlier-count based on how many of the plurality of glance-zones do not intersect with the intersection-zone, and select a vehicle-feature in the vehicle indicated by the occupant, said vehicle-feature located at a location inside the vehicle that corresponds to the intersection-zone, said vehicle-feature indicated by the operator when the outlier-count during the pause-interval is less than how many of the plurality of glance-zones do intersect with the intersection-zone.

2. The system in accordance with claim 1, wherein the controller is configured to maintain the vehicle-feature indicated by the occupant at a selected-status when subsequent-images indicate the glance-direction is characterized as outside the vehicle.

3. The system in accordance with claim 1, wherein the controller is configured to maintain the vehicle-feature indicated by the occupant at a selected-status until subsequent-images indicate the another vehicle-feature has been selected.

4. The system in accordance with claim 1, wherein the controller is configured to release the vehicle-feature indicated by the occupant when the outlier-count during the pause-interval is greater than a moved-threshold.

5. The system in accordance with claim 1, wherein the controller is configured to determine an average-velocity of the plurality of glance-directions from the sequence-of-images received by the controller during a movement-interval, and release the vehicle-feature indicated by the occupant when the average-velocity during the movement-interval is greater than a velocity-threshold.

6. The system in accordance with claim 5, wherein the controller is configured to determine an instantaneous-velocity for each of the plurality of glance-directions during the movement-interval, and exclude any instantaneous-velocity greater than a maximum-velocity from the average-velocity.

7. The system in accordance with claim 5, wherein the movement-interval is less than the pause-interval.

8. The system in accordance with claim 1, wherein the system includes a display positioned to be viewable by the occupant, the vehicle-feature is an icon displayed by the display, and the controller is configured to determine that the icon is indicated by the occupant when the location corresponds to the icon.

9. The system in accordance with claim 8, wherein the controller is configured to highlight the icon indicated by the occupant.

* * * * *